May 1, 1962     H. E. GOBLE     3,032,379
PULLEY
Filed July 30, 1958
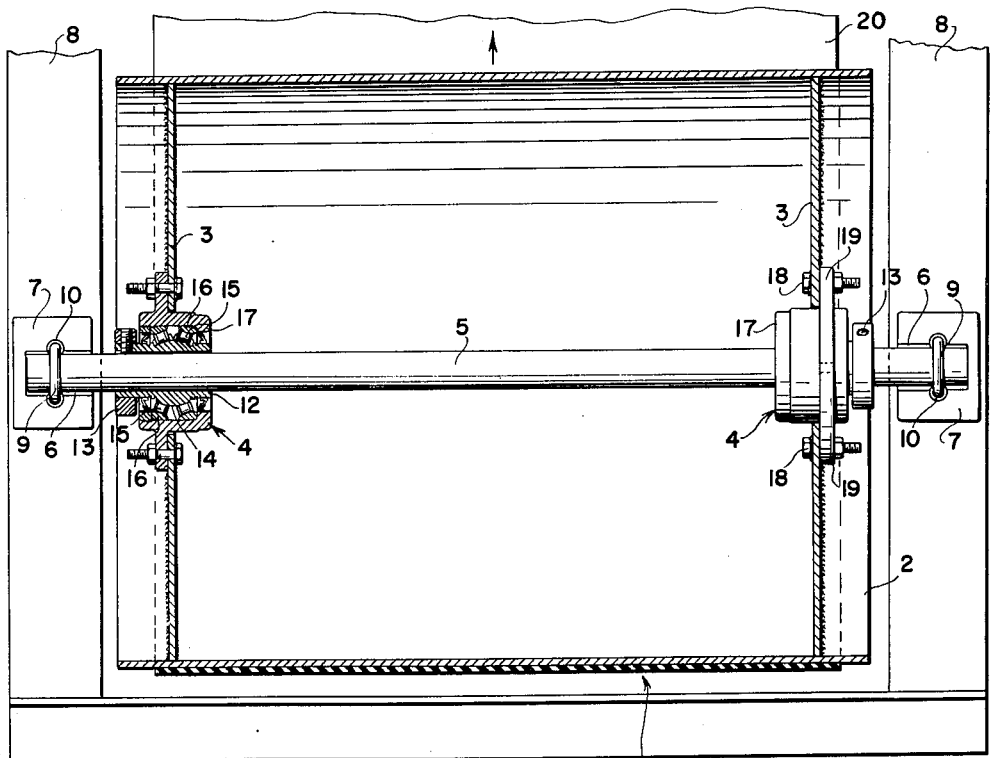
FIG. 1.
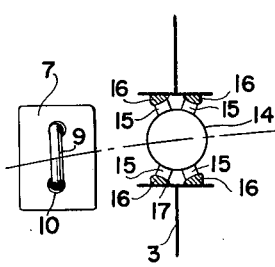
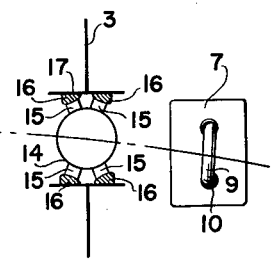
FIG. 2.
FIG. 3.
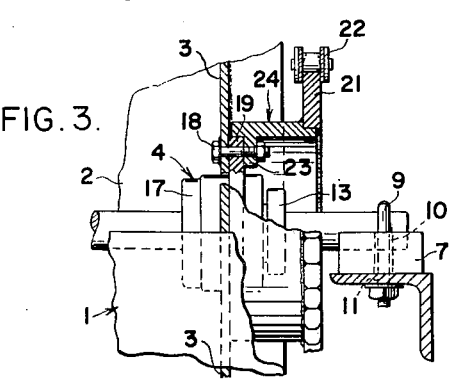
FIG. 4.
INVENTOR.
HARRY E. GOBLE
BY
Ernst W. Schultz
ATTORNEY

United States Patent Office 3,032,379
Patented May 1, 1962

3,032,379
PULLEY
Harry E. Goble, Oak Creek, Wis., assignor to Chain Belt Company, Milwaukee, Wis., a corporation of Wisconsin
Filed July 30, 1958, Ser. No. 751,954
3 Claims. (Cl. 308—20)

This invention relates to pulleys for conveyor belts and particularly to the bearing support of the pulley by the shaft.

In most large conveyors the head and tail pulleys comprise drums having discs or webs fixed to the supporting shafts which rotate therewith. In large conveyors, massive hubs and shafts are required for the strength necessary to support the loads. Patent No. 2,749,157 describes such a pulley hub.

The pulley of the present invention is not fixed to the shaft but is instead journaled on the shaft and relatively simple means is allowed to secure the ends of the shaft to the conveyor frame. Further according to the present invention, two of a particular type of bearing are employed to support the pulley on a shaft of considerably reduced size and the shaft is secured at each end to the conveyor frame to accommodate any flexing of the shaft which occurs. The head pulley includes a sprocket supported directly by the bearing housing and offset therefrom.

A principal object of the invention is to provide an improved and more serviceable pulley.

A more particular object is to provide a pulley mounting not requiring the near-absolute rigidity of the shaft of conventional pulleys.

Another object is to provide a pulley support requiring no bearing alignment respecting the shaft.

Another object is to allow removal of the pulley from the conveyor frame, as for belt replacement, without disassembly of the pulley from the shaft.

The drawings furnished herewith illustrate the best mode of carrying out the invention as presently contemplated and set forth hereinafter.

In the drawings:

FIGURE 1 is a plan view of the end of a conveyor frame with the tail pulley and one of the bearings in section to show the same as mounted on the shaft fixed to the frame;

FIG. 2 is a diagrammatic illustration of the relative movement allowed the shaft and the inner race of the bearings without affecting the pulley and bearing;

FIG. 3 is a plan view of a part of one end of the pulley and showing the sprocket as supported with the pulley on the shaft; and FIG. 4 is an enlarged side elevation of the block supporting an end of the shaft shown in section on the conveyor shown in part and in section.

The pulley 1 shown in the drawings includes the drum 2 provided with the discs or webs 3. Webs 3 are disposed normal to the axis of the pulley and a given distance from the respective ends of the drum and are provided with central openings in which the aligned bearing units 4 are mounted as will be described. The shaft 5 extends through the drum and web openings and the ends of shaft 5 are seated within the recesses 6 of the blocks 7 carried by the spaced, parallel conveyor frame members 8. Each end of the shaft 5 is secured by a U-bolt 9 extending over the shaft and through the aligned holes 10 and 11 formed in the block and corresponding frame member.

Each bearing unit 4 includes the cylindrical inner member 12 which is mounted on shaft 5 and is secured endwise thereof as by the collar 13. According to the invention, the inner bearing races 14, as formed by members 12, are spherical and provide the support of the pulley on shaft 5.

A single row of rolls suitably retained may be employed to support the outer race of each bearing as shown in Patent No. 1,152,663. For improved load support, particularly in the axial direction, two parallel rows of rolls 15 operate over each inner race 14 and may be variously retained, as shown, for example, in Patent No. 2,227,064.

The outer bearing races 16 are fixed within the outer housing 17 of each bearing unit 4 and are convex in section to fit the concave section of the rolls 15 operating therein about the axis of the pulley. Each housing 17 is fixed to the respective web 3 of pulley 1 by the several bolts 18 extending through the web and the flange 19 formed circumferentially of the housing and integral therewith. The heads of bolts 18 are disposed within the drum and welded to the inner faces of webs 3 for assembly purposes.

In the operation of the belt 20 over pulley 1, the weight of the pulley and more particularly the tension of the belt imposes a load on the shaft 5 which is intermediate the supported ends thereof and develops a bending moment according to the load and the distance between bearings 4 and blocks 7.

The distances referred to depend largely on the location of webs 3 and require the consideration of several factors. The location of the webs at the ends of the drum would allow the minimum distance referred to. However, with the webs at the ends of the drum, the drum must be very heavy and strong enough to prevent distortion before wearing out.

To avoid such distortion as much as possible, the webs should be spaced somewhat less than the width of the belt so that the drum has a more direct support of the belt load. Bending of the shaft, however, is more severe when the webs are closer together and such bending can very promptly ruin any conventional bearings. Irrespective of the bearings, the bending of the rotating shaft has the effect of weakening the shaft at the hub and stressing the webs.

According to the present invention, the securement of the hub to the shaft is eliminated altogether and the bearings substituted for the hubs are entirely unaffected by any bending of the shaft. The securement of the webs 3 by bolts 18 to flanges 19 is unaffected by the bending of the shaft. This is particularly important where only the frictional securement of each web and the corresponding flange supports the load of the drum on the shaft. The size of the shaft may be drastically reduced and the webs may be lighter and spaced with more regard to the strength of the drum. The reduction in size of the shaft allows the use of bearings more nearly the required size for the load involved.

When shaft 5 bends under the load applied thereto, the spherical inner races 14 of bearings 4 turn as shown in exaggerated form in FIG. 2, but without in any way affecting the support of rolls 15 or the efficiency and operating life of the bearings. The travel of rolls 15 remains unchanged by such "misalignment" because they follow the outer races 16 which remain parallel and aligned with webs 3.

Since the shaft does not rotate and the load is practically constant, the securement of the ends of the shaft directly to the conveyor frame does not require the firm and extremely tight fit which must be had in securing the pulley to a rotating shaft and where the bending moment moves around the shaft with the rotation.

The recess 6 in block 7 may be slightly larger than the shaft and will allow the slight movement involved, or the holes in block 7 may allow the block and shaft to move relative to the frame and the ends of bolt 9. Since the efficiency (98–99%) of the bearings is not reduced by any misalignment due to the bending of the shaft, no precautions such as keying the shaft to the conveyor frame are considered necessary.

In a given conveyor the driven head pulley may be identical to the tail pulley with the addition of the sprocket 21 as shown in FIG. 3 for driving the pulley by means of the chain 22. Sprocket 21 is secured to the pulley by the bolts 18 extending through the flange 19 of housing 17 and the inwardly projecting annular flange 23 formed integrally with the short cylinder 24. One end of cylinder 24 fits over flange 19 of housing 17 and the other end is suitably fixed to the sprocket as by welding.

The bending of the shaft described and referred to in the claims is, of course, subject to practical limits. The degree may be any small amount which would cause sufficient misalignment to reduce the rating or life of the ordinary anti-friction bearing in common use. The invention as defined by the claims includes and is limited to pulleys and the like having only two bearing units in spaced relation.

Various modes of carrying out the invention are contemplated as within the scope of the following claims particularly pointing out and distinctly claiming the subject matter which is regarded as the invention.

I claim:

1. In a conveyor having spaced frame members, a pulley assembly comprising a cylindrical drum fitting between said members and having spaced discs or webs secured to and within the drum and normal to the axis thereof, each disc or web having a central opening and each frame member having a support block opposite a corresponding opening, a shaft extending through said drum and said openings and having ends supported in said blocks, and bearing units mounted on the shaft and fixed to said discs within the openings thereof, each said unit including inner and outer race members and a series of rolls operating about an axis and between said race members to support the drum for rotation on the shaft and between the ends thereof; the improvement in said assembly wherein the inner races are spherical and the outer races and said axis of the rolls of the two bearing units are secured by the drum in alignment and are unaffected by any movement or change in alignment of the inner races due to bending of the shaft and wherein the support of the shaft in the block allows the slight movement of the shaft in the block occurring due to such bending, and wherein the centers of said inner spherical races lie in the planes of the corresponding webs whereby the load on the drum is supported directly by the webs.

2. In a belt conveyor having spaced frame members, a drive pulley assembly comprising a cylindrical drum fitting between said members and having spaced discs or webs secured to and within the drum and normal to the axis thereof, each disc or web having a central opening and each frame member having abutment means opposite a corresponding opening, a shaft extending through said drum and said openings and having ends supported on said frame and secured against said abutment means, bearing units mounted on the shaft and having peripheral outer flanges fixed to said discs about the openings thereof, each said unit including inner and outer race members and a series of rolls operating about an axis and between said race members to support the drum for rotation on the shaft and between the ends thereof, the inner races being spherical and the outer races and said axis of the rolls of the two bearing units being secured by the drum in alignment and unaffected by any movement or change in alignment of the inner races due to bending of the shaft, and a drive sprocket having a hub fitting the peripheral flange of one of said bearing units and secured thereto for driving the pulley and belt.

3. In a belt conveyor having spaced stationary frame members, a pulley assembly comprising a cylindrical drum fitting between said members and having spaced discs or webs secured to and within the drum and normal to the axis thereof, each discs or web having a central opening and each frame member having abutment means opposite a corresponding opening, a shaft extending through said drum and said openings and having ends supported on said frame and secured against said abutment means, bearing units mounted on the shaft and having peripheral outer flanges bolted to said discs about the openings thereof, each said unit including inner and outer race members and a series of rolls operating about an axis and between said race members to support the drum for rotation on the shaft and between the ends thereof, the inner races being spherical and the outer races and said axis of the rolls of the two bearing units being secured by the drum in alignment and unaffected by any movement or change in alignment of the inner races due to bending the shaft and whereby the bolted securement of the discs with respect to the corresponding flanges is subject only to forces in shear and is unaffected by shaft bending, and means associated with each frame member securing the ends of said shaft to prevent rotation of the shaft while allowing movement of the ends of the shaft due to such bending.

References Cited in the file of this patent

UNITED STATES PATENTS

| | | |
|---|---|---|
| 1,160,592 | Goldman | Nov. 16, 1915 |
| 1,205,063 | Van Houten | Nov. 14, 1916 |
| 1,889,174 | Drexler | Nov. 29, 1932 |
| 2,227,064 | Bryant | Dec. 31, 1940 |
| 2,404,535 | Schmeiser | July 23, 1946 |
| 2,675,281 | Heim | Apr. 13, 1954 |
| 2,687,799 | Saxe | Aug. 31, 1954 |
| 2,767,037 | Williams | Oct. 16, 1956 |
| 2,843,432 | Kindig | July 15, 1958 |